United States Patent [19]
Tarascon

[11] Patent Number: 5,196,279
[45] Date of Patent: Mar. 23, 1993

[54] RECHARGEABLE BATTERY INCLUDING A $LI_{1+x}MN_2O_4$ CATHODE AND A CARBON ANODE

[75] Inventor: Jean-Marie Tarascon, Martinsville, N.J.

[73] Assignee: Bell Communications Research, Inc., Livingston, N.J.

[21] Appl. No.: 646,694

[22] Filed: Jan. 28, 1991

[51] Int. Cl.$^5$ ............................................. H01M 10/40
[52] U.S. Cl. ................................... 429/194; 429/218; 429/224
[58] Field of Search ...................... 429/194, 218, 224; 423/605

[56] References Cited
U.S. PATENT DOCUMENTS

| | | | |
|---|---|---|---|
| 4,246,253 | 1/1981 | Hunter | 429/224 X |
| 4,304,825 | 12/1981 | Basu | 429/218 X |
| 4,423,125 | 12/1983 | Basu | 429/194 |
| 4,828,834 | 5/1989 | Nagaura et al. | 429/224 X |
| 5,053,297 | 10/1991 | Yamahira et al. | 429/218 X |
| 5,110,696 | 5/1992 | Shokoohi | 429/218 |

OTHER PUBLICATIONS

"$Li_xCoO_2(0<x\leq1)$ A New Cathode Material for Batteries of High Energy Density", K. Mizushima et al., *Mat. Res. Bull.*, 15, 1980, 783-789.

"Electrochemical Extraction of Lithium from $LiMn_2O_4$" M. M. Thackery et al., *Mat. Res. Bull.*, 19, 1984, 179-187.

"Studies of Lithium Intercalation into Carbons Using Nonaqueous Electrochemical Cells", Rosamaria Fong et al., *Journal of the Electrochemical Society*, 107, (Jul. 1990) 2009-2013.

Primary Examiner—Anthony Skapars
Attorney, Agent, or Firm—Leonard Charles Suchyta; Lionel N. White

[57] ABSTRACT

A lithium metal free non-aqueous secondary battery including a carbon anode and a lithium manganese oxide cathode is described. In operation, lithium from the lithium manganese oxide positive electrode intercalates with the carbon negative electrode and in this manner lithium ions are rocked back and forth during charge-discharge cycling. Lithium manganese oxide of the formula $Li_2Mn_2O_4$ may also be used as the cathode and this material may be prepared by a novel technique which involves reacting $LiMn_2O_4$ with lithium iodide at low temperatures (150° C.), or alternatively by refluxing $LiMn_2O_4$ in an acetonitrile solution of lithium iodide.

8 Claims, 3 Drawing Sheets 5,196,279

RECHARGEABLE BATTERY INCLUDING A LI$_{1+x}$MN$_2$O$_4$ CATHODE AND A CARBON ANODE

BACKGROUND OF THE INVENTION

This invention relates to secondary lithium batteries. More particularly, the present invention relates to secondary or rechargeable lithium batteries using a lithium intercalation positive electrode (cathode) and a lithium intercalated negative electrode (anode).

Secondary lithium batteries using an intercalation compound as cathode and free lithium metal as anode have been studied intensively during the past decade due to their potential technological significance. Unfortunately, these studies have revealed that the inherent dangers associated with the use of free lithium preclude the commercial viability of such batteries. Efforts directed toward obviating this limitation have focused upon the concept of a "rocking chair battery" which substitutes another intercalation compound as the anode for the free lithium metal.

The output voltage of this rocking chair battery is defined by the difference in chemical potential of the two insertion compounds with respect to lithium metal. Accordingly, the cathode and anode must comprise intercalation compounds that can intercalate lithium at both high and low voltages, respectively.

Recently, workers in the art demonstrated the viability of this concept and indicated future commercialization of such cells in D, AA or coin-type batteries. These cells include either a LiCoO$_2$ or LiNiO$_2$ cathode, an electrolyte and a carbon anode. These rocking chair batteries are described as being superior to the available nickel-cadmium cells and do not require a stringent environment for fabrication since the lithium based cathode employed is stable in an ambient atmosphere, and the anode is not free lithium metal, but an intercalation compound used in its discharged state (without intercalated Li) that is stable in ambient atmosphere when the cells are assembled.

SUMMARY OF THE INVENTION

During the charging cycle, lithium deintercalates from the cathode and is shuttled to the carbon anode and intercalated therein. Due to the loss of lithium associated with the presence of certain irreversible secondary reactions in these rechargeable lithium cells, an excess of lithium is needed. This end is attained in the rocking chair batteries by using an excess of cathode material which results in a significant loss in cell capacity. Alternatively, a stable lithium based cathode may be used which contains greater than 1 lithium atom per unit formula, so creating lithium reservoir without effecting cell capacity. However, no Li$_x$CoO$_2$ phase is known to exist in which x is greater than one, and although in the LiNiO$_2$ system a second intercalation plateau exits at 1.9 volts (below the 2.5 volt level at which lithium-based compounds are stable in air) which extends to a value of x between 1 and 2, the instability in air of Li$_{1+x}$NiO$_2$ prevents the consideration of this phase as a lithium reservoir.

In accordance with the present invention, these prior art limitations are effectively alleviated by the use of an anode comprising intercalated lithium. The described cell comprises a LiMn$_2$O$_4$ cathode and carbon in the form of graphite or petroleum coke as the anode. The cell is represented as follows:

Li$_{1-x}$Mn$_2$O$_4$|Electrolyte|Li$_x$C$_6$.

Cell as made→x=0.

Cell after 1st charge→X=1.

The advantage of using lithiated compounds for a lithium intercalation cathode is that they may be used in combination with another intercalation compound as the anode to eliminate the use of lithium metal in the system and maintain high cell capacity with a minimum reduction in the cell voltage.

Upon charge, lithium from the LiMn$_2$O$_4$ intercalates with the carbon anode to form LiC$_6$ and then becomes the anode. Thus, lithium ions are "rocked back and forth" during the charge-discharge cycling. The LiMn$_2$O$_4$ which is stable in air now serves a the lithium ion-reservoir. It has been found that the use of petroleum coke as the anode results in an output voltage similar to that attained with LiNiO$_2$ or LiCoO$_2$. However, the capacity of LiMn$_2$O$_4$ |Electrolyte|C cells can be doubled, and the energy density increased by the use of a Li$_2$Mn$_2$O$_4$ cathode. Heretofore, there has not been a convenient method for preparing this compound. This limitation has also been overcome and there is described herein a novel synthesis for the preparation of Li$_2$Mn$_2$O$_4$ in an ambient atmosphere.

BRIEF DESCRIPTION OF THE DRAWING

The invention will be more fully understood by reference to the following detailed description taken in conjunction with the accompanying drawing wherein.

DESCRIPTION OF THE INVENTION

Figure 1:
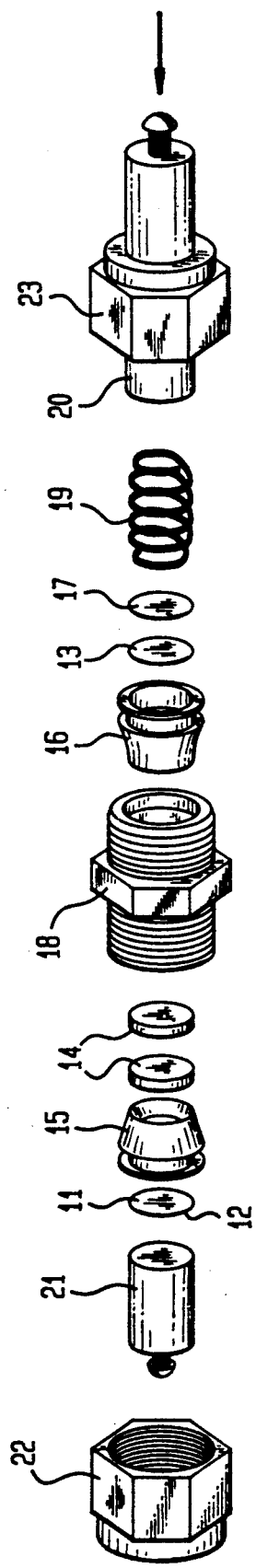
FIG. 1 is an exploded view of a secondary lithium cell in accordance with the invention.

With reference now to FIG. 1, there is shown an exploded view of a typical secondary lithium battery of the invention. Shown is cathode 11 disposed upon quartz substrate 12, anode 13 and glass paper 14 which has been inserted in a suitable electrolyte such as LiClO$_4$ propylene carbonate. The structure also includes polypropylene fittings 15 and 16, steel disc 17, fitting 18, spring 19, plunger 20, stainless steel rod 21 and cap screws 22 and 23. The fittings when compressed provide an airtight ambient for the battery. In order to prevent electrical contact between plunger 20 and the various fittings in the battery, insulating layers are inserted between the plunger and the cell fittings.

In the fabrication of a lithium battery in accordance with the invention, the initial step involves the preparation of Li$_1$Mn$_2$O$_4$. This end may be obtained by reacting appropriate amounts of Li$_2$CO$_3$ and MnO$_2$ powders at 800° C. In order to obtain Li$_2$Mn$_2$O$_4$ a novel technique has been found wherein LiMn$_2$O$_4$ is reacted with LiI whose redox potential of 2.8 volts is similar to the potential at which the LiMn$_2$O$_4$→Li$_2$Mn$_2$O$_4$ phase transformation occurs electrochemically. This is effected by mixing LiMn$_2$O$_4$ and LiI powders in a 1:1 weight ratio (i.e., LiI in excess) and placing the resultant mixture in an evacuated seated ampoule which is heated to a temperature of approximately 150° C. The reaction effected may be represented as follows:

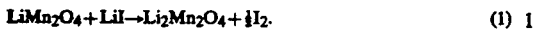

$$\text{LiMn}_2\text{O}_4 + \text{LiI} \rightarrow \text{Li}_2\text{Mn}_2\text{O}_4 + \tfrac{1}{2}\text{I}_2. \quad (1)$$

Within a few hours the LiMn$_2$O$_4$ is reduced by the LiI as evidenced by iodine coloration. After 24 hours of reaction, one end of the ampoule is cooled to room temperature in order to allow iodine to condense apart from the reacted material. The tube is then opened and a loose brown powder removed. The powder is then washed with a suitable solvent, such as acetonitrile, to remove traces of LiI. X-ray diffraction and chemical analysis of the powder confirms that the material is Li$_2$Mn$_2$O$_4$. An alternative, simpler and more convenient technique for preparing Li$_2$Mn$_2$O$_4$ consists in heating with reflux the LiMn$_2$O$_4$ phase in an acetonitrile solution of LiI. After two days of reaction at a fixed temperature of approximately 82° C. (temperature defined by the ebullition temperature of acetonitrile), the solution is filtered and X-ray diffraction of the resulting material confirms the presence of Li$_2$Mn$_2$O$_4$. This material is stable in ambient environment for several days. We have used Li$_1$Mn$_2$O$_4$, but similar reactions can be made using λ-MnO$_2$ (e.g., Mn$_2$O$_4$) instead of LiMn$_2$O$_4$ as the starting material to prepare Li$_2$Mn$_2$O$_4$.

The lithium manganese oxide prepared in accordance with the described techniques are next mixed with a small amount of carbon black (10% by weight) and a binder and pressed into a pellet which is heated at temperature within the range of 300° to 350° C. for a time period ranging from 50 to 60 minutes prior to being used as the lithium-based cathode in the battery of FIG. 1. Specifically, electrochemical swagelock test cells were prepared in a helium atmosphere using a graphite disc anode separated from a LiMn$_2$O$_4$ or Li$_2$Mn$_2$O$_4$ cathode by porous glass paper soaked in an electrolyte containing 1 molar LiClO$_4$ + 1 molar 12-Crown-4 ether dissolved in propylene carbonate. The cells so obtained were then evaluated to determine the behavior of cell voltage during discharge as a function of the change in lithium atom content per formula unit for the reversible formation of LiMn$_2$O$_4$ or Li$_2$Mn$_2$O$_4$.

Figure 2:
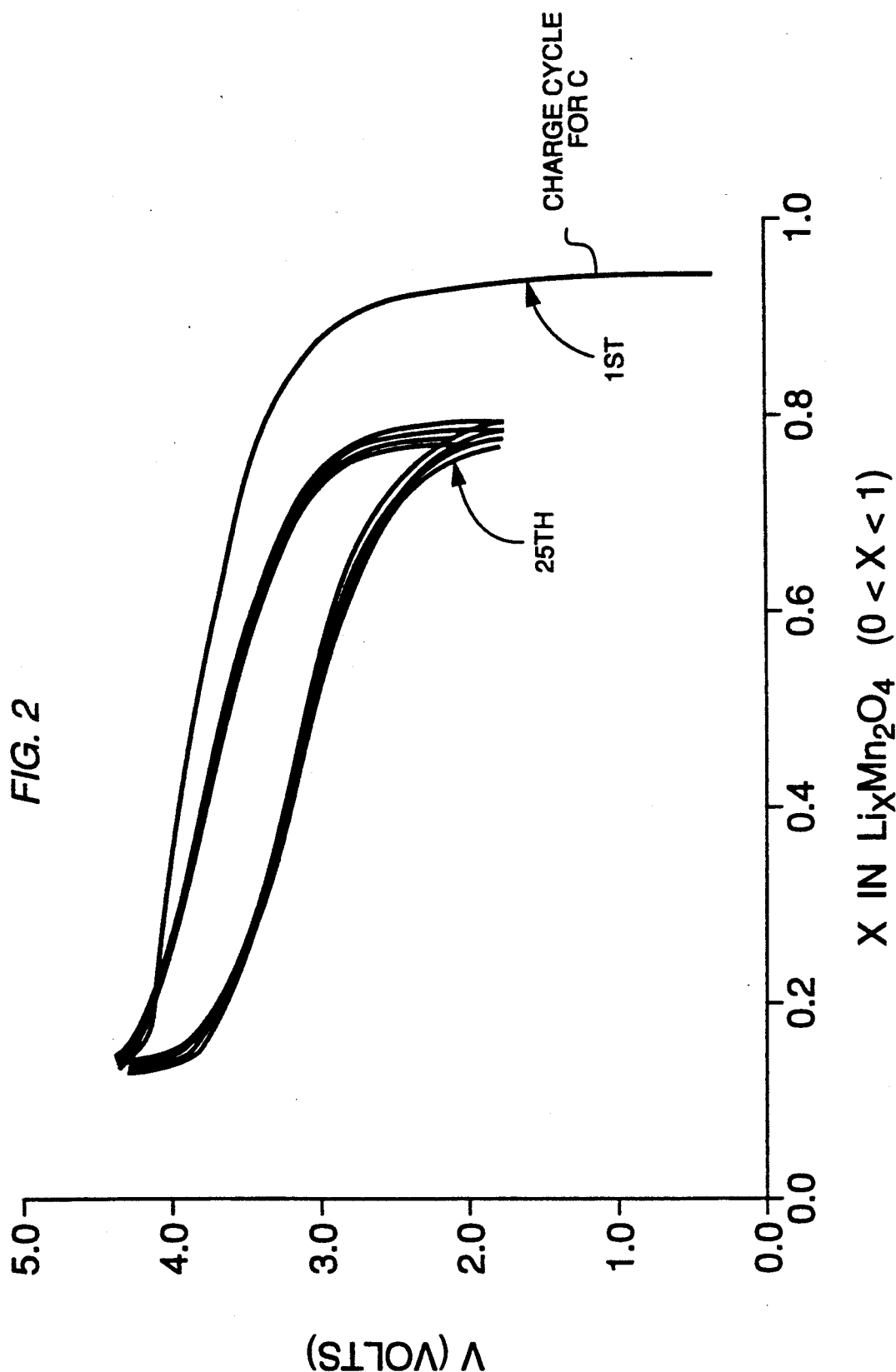
FIG. 2 is a graphical representation on coordinates of lithium atoms, x, in Li$_x$Mn$_2$O$_4$ (021 x<1) against voltage in volts showing the cycling characteristics of the lithium battery of the invention during cycling (5 cycles) between 1.8 and 4.5 volts at a current density of 0.8 mA/cm$^2$.

With reference now to FIG. 2, there is shown a graphical representation on coordinates of lithium atoms, x, in Li$_x$Mn$_2$O$_4$ against voltage in volts showing the cycling characteristics for the first 5 discharge-charge cycles for the described cell. The FIGURE reveals that when charge is initiated (cell voltage≈0) manganese beings to reduce and Li$^+$ ions intercalate into the carbon (graphite) to form Li$_x$C$_6$, and this process proceeds until a voltage of 4.5 volts. Then Li$_x$C$_6$ becomes the anode upon discharge. Note that 0.8 Li atoms per formula unit can be reversibly intercalated at an average potential of 3.7 volts while cycling between 4.5 to 2 bolts. Furthermore, the cell maintains its capacity of subsequent cycles, so that a loss in capacity of only 2% was observed after 25 cycles.

Figure 3:
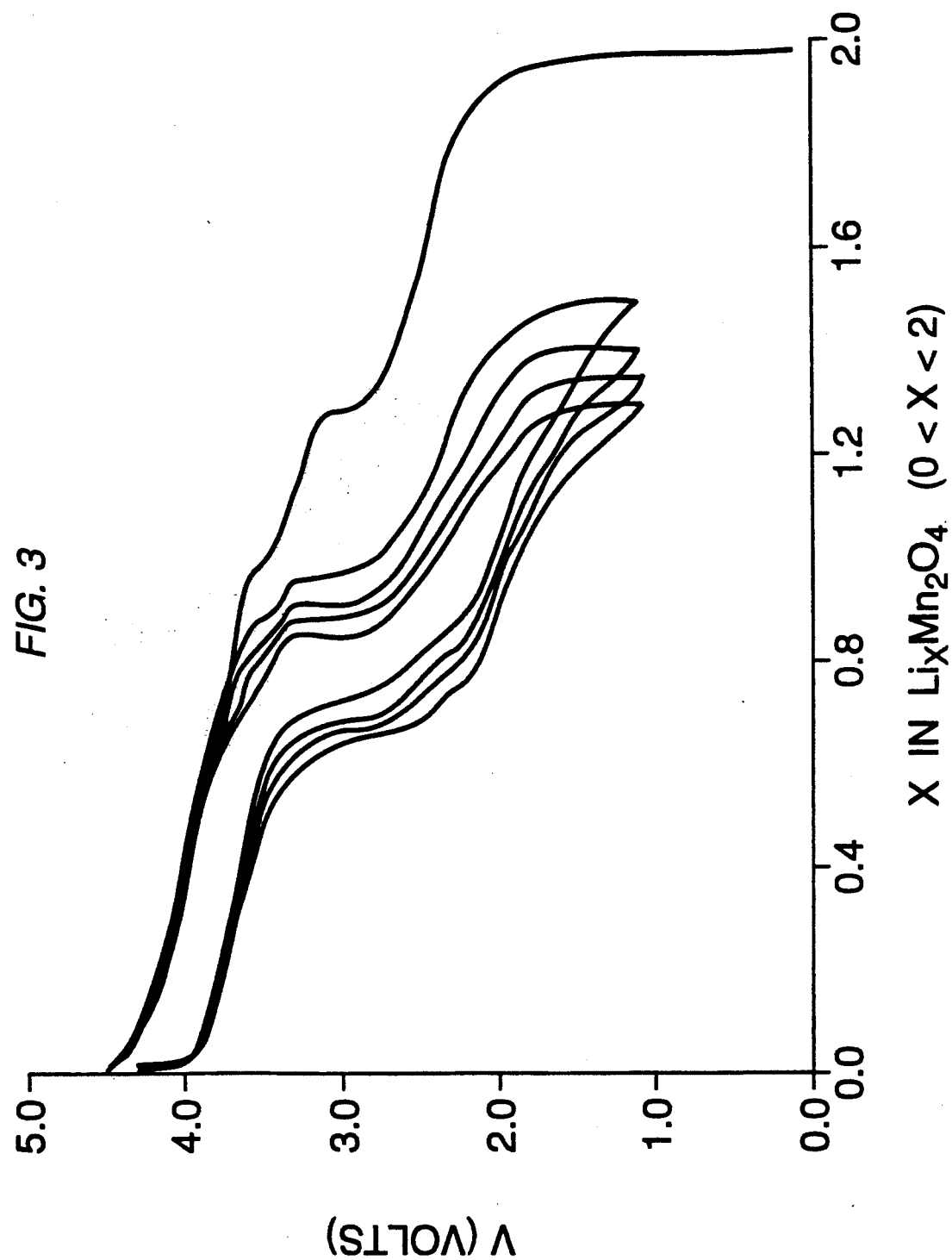
FIG. 3 is a graphical representation on coordinates of lithium atoms, x, in Li$_x$Mn$_2$O$_4$ (0<X<2) against voltage in volts showing the cycling characteristics of the lithium battery of the invention between 1 and 4.5 volts at a current density of 0.6 mA/cm$^2$ wherein the lithium content is in excess of one atom.

With reference now to FIG. 3, there is shown a graphical representation on coordinates of lithium atoms, x, in Li$_x$Mn$_2$O$_4$ (0 < x < 2) against voltage in volts showing the cycling characteristics for the first 4 discharge-charge cycles for the described cell. The FIGURE reveals that when charge is initiated (cell voltage≈0 volts), the manganese again beings to reduce and lithium ions intercalate the carbon anode. The process proceeds until a voltage of 4.5 volts is reached, a potential at which 2 Li atoms have been transferred to the carbon anode. Then the cell is discharged and recharged several times. Note that 1.4 that 1.4 Li atoms per formula unit can be reversibly intercalated in the material when the cells are cycled between 4.5 volts and 1 volt; so that the cell capacity is greater than that of cell 1, thereby emphasizing the advantage of using Li$_2$Mn$_2$O$_4$ as the Li-bearing ternary cathode. After the large loss in capacity during the first charge, the cell then retains its capacity over several cycles. The electrochemical behavior of these cells could be optimized by better adjusting the amount of cathode and anode materials.

While the invention has been described in detail in the foregoing specification, it will be understood that variations may be made without departing from the spirit and scope of the invention. Thus, it will be appreciated that the carbon anode may be selected from among graphite or petroleum coke. Tungsten oxide (WO$_2$) or other appropriate intercalatable material may also be employed as the initial anode.

What is claimed is:

1. Lithium metal free non-aqueous secondary battery comprising a carbon anode of the formula Li$_x$C$_6$ wherein x ranges from 0 to 1, an electrolyte, and a cathode consisting essentially of lithium manganese oxide of the formula Li$_x$Mn$_2$O$_4$ wherein x ranges from 0 to 2.

2. Lithium metal free non-aqueous secondary battery comprising an electrolyte and two air-stable electrodes consisting of a carbon negative electrode and a lithium manganese oxide positive electrode.

3. Lithium metal free non-aqueous secondary battery comprising an electrolyte and two air-stable electrodes consisting of a carbon negative electrode and (b) a positive intercalation electrode consisting essentially of lithium manganese oxide of the formula Li$_x$Mn$_2$O$_4$ wherein x ranges from 0 to 2.

4. Battery in accordance with claim 3 wherein the anode is free carbon.

5. Battery in accordance with claim 3 wherein the electrolyte is a solution of lithium perchlorate in propylene carbonate.

6. Battery in accordance with claim 3 wherein the electrolyte is stable upon oxidation up to 4.5 volts.

7. Battery in accordance with claim 4 wherein the anode is selected from the group consisting of graphite and petroleum coke.

8. Lithium metal free non-aqueous secondary battery comprising an electrolyte and two air-stable electrodes consisting of a carbon negative electrode and a positive intercalation electrode consisting essentially of a mixture of lithium manganese oxides of the formula Li$_{1+x}$Mn$_2$O$_4$ wherein x ranges from 0 to 1.

* * * * *